(12) United States Patent
Chiodini

(10) Patent No.: US 12,375,112 B2
(45) Date of Patent: Jul. 29, 2025

(54) METHOD FOR CALIBRATING A MULTI-CHANNEL RADIO RECEIVER

(71) Applicant: SAFRAN ELECTRONICS & DEFENSE, Paris (FR)

(72) Inventor: Alain Michel Chiodini, Orgeval (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 364 days.

(21) Appl. No.: 17/940,484

(22) Filed: Sep. 8, 2022

(65) Prior Publication Data

US 2023/0100288 A1    Mar. 30, 2023

(30) Foreign Application Priority Data

Sep. 29, 2021   (FR) ...................................... 2110246

(51) Int. Cl.
*H04B 1/10*   (2006.01)
*H04B 1/16*   (2006.01)
*H04B 7/08*   (2006.01)

(52) U.S. Cl.
CPC ............. *H04B 1/10* (2013.01); *H04B 1/1607* (2013.01); *H04B 7/0854* (2013.01); *H04B 2001/1054* (2013.01)

(58) Field of Classification Search
CPC .......... H04B 1/06; H04B 1/10; H04B 1/1607; H04B 7/0854; H04B 2001/1054
See application file for complete search history.

(56) References Cited

U.S. PATENT DOCUMENTS 10,257,008 B2 *   4/2019   Sharma ................ H04L 25/0224
2017/0227653 A1 *   8/2017   Carrie ................... G01S 19/235

FOREIGN PATENT DOCUMENTS

KR         10-1971685 B1       4/2019
WO    WO-2018125732 A1 *   7/2018   ........... H04L 25/022

OTHER PUBLICATIONS

Achim Dreher et al., "Compact Adaptive Multi-antenna Navigation Receiver", 25th International Technical Meeting of the Satellite Division of The Institute of Navigation, Sep. 17-21, 2012, pp. 917-925, Nashville TN.
French Preliminary Search Report of FR 2110246 dated May 25, 2022.

* cited by examiner

*Primary Examiner* — Jinsong Hu
*Assistant Examiner* — Farideh Madani
(74) *Attorney, Agent, or Firm* — Sughrue Mion, PLLC

(57) ABSTRACT

A method for calibrating a receiver includes determining and correcting, for each analog reception channel other than a reference channel, a phase shift with the reference channel. The determining includes calculating an observed covariance matrix representative of a covariance between samples, collected in parallel on each of the analog reception channels over a period of time, of one or more incident reference radio signals on the multi-element antenna, obtaining an estimate of a reference covariance matrix representative of the covariance between samples of the incident radio signal(s) which would be collected in parallel on each of the analog reception channels over the period of time in the absence of phase shift between the analog reception channels, calculating a product matrix, resulting from a term-by-term matrix product of the observed covariance matrix with the estimate of the reference covariance matrix, and determining the argument of complex terms of the product matrix.

18 Claims, 2 Drawing Sheets

METHOD FOR CALIBRATING A MULTI-CHANNEL RADIO RECEIVER

TECHNICAL FIELD

The field of the invention is that of calibrating the analog reception channels of radio receivers equipped with a multi-element antenna.

The invention finds particular application in the receivers of satellite positioning systems, in particular those equipped with an anti-jamming processing module, or else in the receivers of mobile communication systems.

PRIOR ART

Radio receivers equipped with a multi-element antenna comprise an analog reception chain having several analog reception channels which each comprise an antenna element and an RF front-end circuit typically in charge of filtering and amplifying the incident signal on the antenna element associated therewith.

The performance of radio receivers depends in particular on the ability to properly calibrate their analog reception chain, that is to say to properly compensate for the amplitude and phase differences between the different channels of the analog reception chain due to the physical differences between the components and the lines making up each channel.

This is the case, for example, of anti-jamming solutions equipping satellite positioning systems (GNSS systems for "Global Navigation Satellite Systems"), for example GPS, GALILEO or GLONASS systems. These anti-jamming solutions use a Controlled Radiation Pattern Antenna (CRPA) and spatial filtering techniques to create and direct gain notches (corresponding to zero points in the radiation pattern of the CRPA antenna) towards the sources of jamming in order to excise them spatially. For this purpose, the signals from the various antenna elements of the CRPA antenna are weighted in amplitude and in phase before summing them so as to form a single signal, purged of jamming signals, which feeds the input of the GNSS receiver.

DISCLOSURE OF THE INVENTION

The invention aims at increasing the performance of radio receivers equipped with a multi-element antenna by means of an improved calibration of their analog reception chains. To this end, it proposes a computer-implemented method for calibrating a receiver comprising a plurality of analog reception channels each including an antenna element of a multi-element antenna, the plurality of analog reception channels comprising a reference channel. This method comprises determining and correcting for each analog reception channel other than the reference channel, a phase shift with the reference channel. Said determination comprises:
  calculating an observed covariance matrix representative of the covariance between pairs of series of samples, collected in parallel on each channel of the plurality of analog reception channels over a period of time, of one or more incident reference radio signals on the multi-element antenna,
  obtaining an estimate of a reference covariance matrix representative of the covariance between pairs of series of samples of said incident radio signal(s) which would be collected in parallel on each channel of the plurality of analog reception channels over the period of time in the absence of phase shift between the analog reception channels,
  calculating a product matrix, resulting from the term-by-term matrix product of the observed covariance matrix with the estimate of the reference covariance matrix;
  determining the argument of complex terms of the product matrix.

Some preferred but non-limiting aspects of this method are as follows:
  the estimate of the reference covariance matrix is made up of terms which depend on a linear combination of matrices obtained by performing the product $S^H S$ of spatial signatures S of the reference radio signal(s) on the multi-element antenna, each spatial signature expressing the response of each antenna element to each of the reference radio signal(s);
  each spatial signature of a reference radio signal is weighted in the linear combination by a power of the reference radio signal;
  obtaining the estimate of the reference covariance matrix comprises obtaining a pre-calculated matrix;
  obtaining the estimate of the reference covariance matrix comprises calculating the estimate of the reference covariance matrix;
  calculating the estimate of the reference covariance matrix comprises estimating the direction of arrival of the reference radio signal(s) on the multi-element antenna;
  it comprises estimating the spatial signature of the reference radio signal(s) on the multi-element antenna;
  it comprises reiterating the steps of determining and correcting, for each analog reception channel other than the reference channel, a phase shift with the reference channel;
  determining, for each analog reception channel other than the reference channel, the phase shift with the reference channel is repeated, an absolute phase shift indicator is calculated at the end of each of the repetitions and a new correction, for each analog reception channel other than the reference channel, of the phase shift with the reference channel is operated if the absolute phase shift indicator calculated at the end of a repetition is greater than a threshold;
  the new correction uses, for each analog reception channel other than the reference channel, an average of the phase shifts with the reference channel determined at each iteration subsequent to the previous correction.

BRIEF DESCRIPTION OF THE DRAWINGS

Other aspects, purposes, advantages and characteristics of the invention will appear better upon reading the following detailed description of preferred embodiments thereof, given by way of non-limiting example, and made with reference to the appended drawings on which.

DETAILED DISCLOSURE OF PARTICULAR EMBODIMENTS

Figure 1:
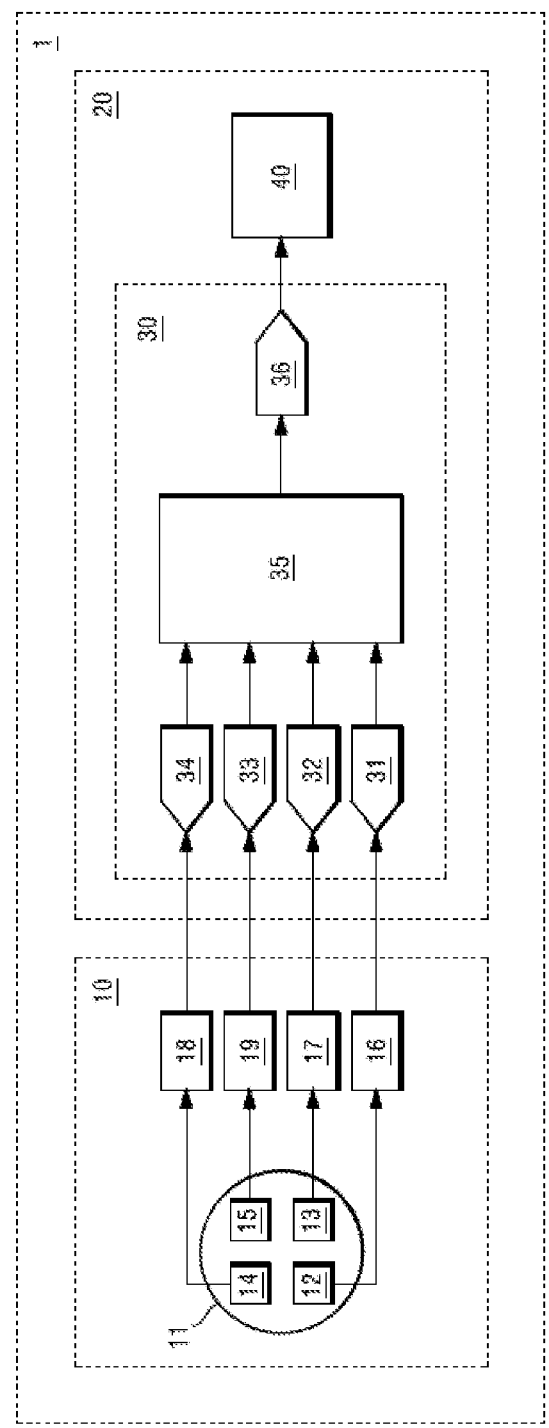
FIG. 1 is a diagram of a possible embodiment of a receiver according to the invention.

FIG. 1 illustrates a multi-channel radio receiver 1 comprising an analog block 10 and a processing block 20.

The analog block 10 comprises a multi-element antenna 11 whose antenna elements 12, 13, 14, 15, for example of the patch type, can be arranged on an antenna plate. The multi-element antenna 11 is for example of the CRPA type. The antenna elements are for example four in number.

The analog block 10 can also comprise RF front-end circuits 16, 17, 18, 19, each of these RF front-end circuits being associated with one of the antenna elements 12, 13, 14, 15 to form an analog reception channel. In a manner known per se, the RF front-end circuits allow to filter and amplify the incident radio signals on the antenna.

The processing block 20 comprises a spatial filtering unit 30 provided with a bank of analog-to-digital converters 31, 32, 33, 34 configured to perform synchronous sampling of the signals originating from the various analog reception channels. The spatial filtering unit 30 further comprises a spatial processing module 35 in charge of digitally translating the samples from the analog-to-digital converters 31, 32, 33, 34 towards the baseband, of calculating and applying phase and amplitude weightings to the signals coming from the various antenna elements, of summing these signals to form a single signal and to digitally translate the single signal from the baseband to the radio frequency domain. The single signal thus translated is supplied to a digital-to-analog converter 36.

The processing block 20 moreover comprises, downstream of the digital-to-analog converter 36, a single-channel radio reception unit 40 in charge of processing the single signal delivered by the spatial filtering unit 30. Taking the example of a receiver of a GNSS system, the spatial processing module 35 of the spatial filtering unit 30 is more particularly configured to implement anti-jamming processing and deliver a single signal purged of jamming signals. The single-channel radio reception unit 40 forms a conventional GNSS receiver in charge of calculating navigation data.

The invention relates to a method, for example implemented by the spatial processing module 35, for calibrating the receiver 1 aiming at compensating for the phase differences affecting its analog reception channels. According to this method, one of the analog reception channels constitutes a reference channel and the method comprises determining and correcting, for each analog reception channel other than the reference channel, a phase shift with the reference channel.

The determination, for each analog reception channel other than the reference channel, of a phase shift with the reference channel operates more precisely as follows.

Figure 2:
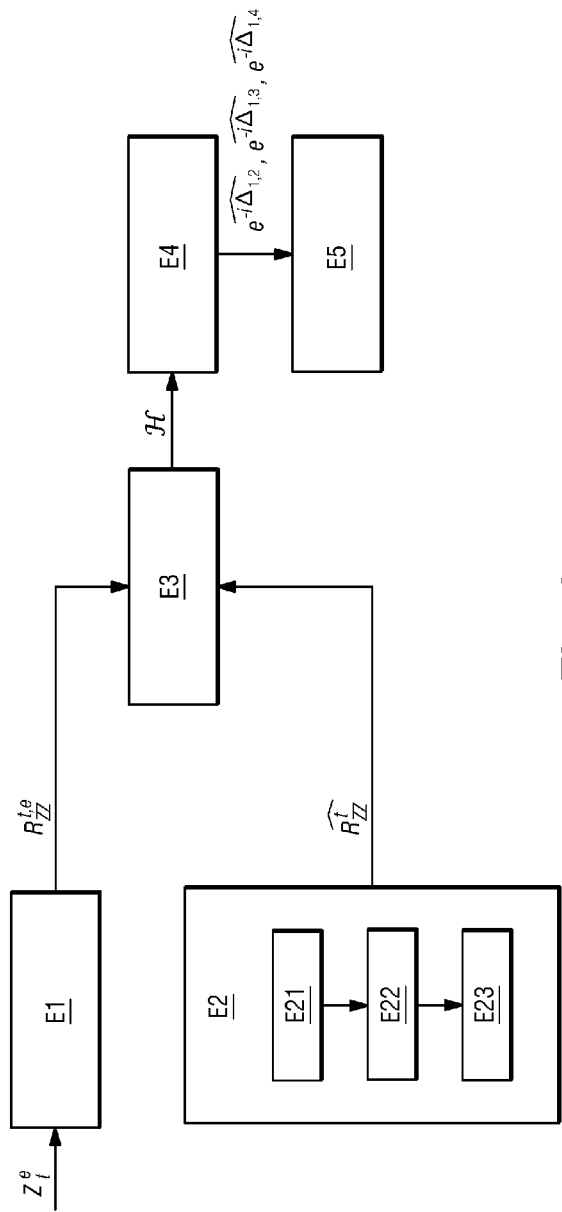
FIG. 2 is a diagram illustrating the steps of a method according to the invention.

With reference to FIG. 2, the method first of all comprises a step E1 of calculating an observed covariance matrix $R_{ZZ}^{t,e}$ representative of the covariance between pairs of series (or vectors) of samples, collected in parallel on each of the analog reception channels over a period of time, of one or more incident reference radio signals on the multi-element antenna. This covariance is also called inter-correlation or cross-correlation.

For this purpose, the various analog reception channels are sampled synchronously, for example at a rate of 40.96 mega samples per second. The various streams of resulting samples are juxtaposed and cut temporally (for example over periods of time covering 25 µs) into contiguous matrix segments $Z_t^e$ (where t designates a period of time and where e expresses the fact that the samples collected are full of errors caused by calibration faults of the analog reception channels).

A matrix segment thus groups together series of samples, collected in parallel on each channel of the plurality of analog reception channels over a period of time, of one or more incident reference radio signals on the multi-element antenna. This matrix segment can correspond to a rectangular matrix of dimensions N (1024 samples in the example)×M (the number of channels, ≥2, this number being taken equal to four in what follows).

The observed covariance matrix can be calculated for each $Z_t^e$ according to $$R_{ZZ}^{t,e} = \frac{1}{N}(Z_t^e)^H Z_t^e,$$

where $(\bullet)^H$ denotes the operation performing the transpose-conjugate of a given matrix.

The calibration faults affecting the analog reception channels can be modeled according to $$\Xi = \begin{pmatrix} \xi_1 & 0 & 0 & 0 \\ 0 & \xi_2 & 0 & 0 \\ 0 & 0 & \xi_3 & 0 \\ 0 & 0 & 0 & \xi_4 \end{pmatrix},$$

with $\xi_m = (1+\rho_m)e^{i\varepsilon_m}$, $1 \leq m \leq 4$, a complex coefficient expressing the calibration defect affecting the channel m ($\rho_m$ and $\varepsilon_m$ are variables expressing respectively the amplitude and phase differences, for example centered Gaussian random variables).

These calibration defects affect the samples of the matrix segment $Z_t$ according to $Z_t^e = Z_t \Xi$. In the context of the invention, the amplitude difference is neglected, which is particularly possible in the example of implementation of the invention by a spatial filtering unit for anti-jamming processing within a GNSS receiver where this discrepancy contributes little to the performance degradation of the spatial filtering unit. As a result of which, in the following, $\xi_m$ is assimilated to $e^{i\varepsilon_m}$.

The calibration error is assumed to be constant over a fairly long period (several seconds). The observed covariance matrix $R_{ZZ}^{t,e}$ incorporates information relating to phase shifts. Indeed, by neglecting the noise contribution of the receiver (because the signal-to-noise ratio is assumed to be high), this matrix can be expressed as:

$$R_{ZZ}^{t,e} = \frac{1}{N}(Z_t^e)^H Z_t^e = [r_{k,l}^{t,e}] = \begin{pmatrix} r_{1,1}\xi_1^*\xi_1 & r_{1,2}\xi_1^*\xi_2 & r_{1,3}\xi_1^*\xi_3 & r_{1,4}\xi_1^*\xi_4 \\ r_{2,1}\xi_2^*\xi_1 & r_{2,2}\xi_2^*\xi_2 & r_{2,3}\xi_2^*\xi_3 & r_{2,4}\xi_2^*\xi_4 \\ r_{3,1}\xi_3^*\xi_1 & r_{3,2}\xi_3^*\xi_2 & r_{3,3}\xi_3^*\xi_3 & r_{3,4}\xi_3^*\xi_4 \\ r_{4,1}\xi_4^*\xi_1 & r_{4,2}\xi_4^*\xi_2 & r_{4,3}\xi_4^*\xi_3 & r_{4,4}\xi_4^*\xi_4 \end{pmatrix} =$$

$$\begin{pmatrix} r_{1,1} & r_{1,2}e^{i\Delta_{1,2}} & r_{1,3}e^{i\Delta_{1,3}} & r_{1,4}e^{i\Delta_{1,4}} \\ r_{1,2}^*e^{-i\Delta_{1,2}} & r_{2,2} & r_{2,3}e^{i\Delta_{2,3}} & r_{2,4}e^{i\Delta_{2,4}} \\ r_{1,3}^*e^{-i\Delta_{1,3}} & r_{2,3}^*e^{-i\Delta_{2,3}} & r_{3,3} & r_{3,4}e^{i\Delta_{3,4}} \\ r_{1,4}^*e^{-i\Delta_{1,4}} & r_{2,4}^*e^{-i\Delta_{2,4}} & r_{3,4}^*e^{-i\Delta_{3,4}} & r_{4,4} \end{pmatrix}$$

with $e^{i\Delta_{k,l}} = e^{i(\varepsilon_l - \varepsilon_k)} = e^{-i\Delta_{l,k}}$, $1 \leq k \leq 4$, $1 \leq l \leq 4$.

The covariance matrix being Hermitian, $r_{k,k} \in \mathbb{R}^+$ and $r_{k,l} \in \mathbb{C}$, $r_{l,k} = r^*_{k,l}$, $k \neq l$.

If the matrix $R_{ZZ}^{t,e}$ does not allow to directly estimate the phase shifts, it nevertheless allows to express relative phase shifts $\Delta_{1,2}$, $\Delta_{1,3}$, $\Delta_{1,4}$ between the channel 1 acting here as reference channel and each of the other channels 2, 3 and 4.

Still referring to FIG. 2, the method comprises a step E2 of obtaining an estimate $\hat{R}_{zz}^t$ of a reference covariance matrix $R_{ZZ}^t$, the reference covariance matrix $R_{ZZ}^t$ being representative of the covariance between pairs of series of samples of said at least one incident radio signal which would be collected in parallel on each channel of the plurality of analog reception channels over the period of time in the absence of a phase shift between the analog reception channels.

The reference covariance matrix is expressed as follows:

$$R_{ZZ}^t = \frac{1}{N} Z_t^H Z_t = [r_{k,l}^t] = \begin{pmatrix} r_{1,1} & r_{1,2} & r_{1,3} & r_{1,4} \\ r_{1,2}^* & r_{2,2} & r_{2,3} & r_{2,4} \\ r_{1,3}^* & r_{2,3}^* & r_{3,3} & r_{3,4} \\ r_{1,4}^* & r_{2,4}^* & r_{3,4}^* & r_{4,4} \end{pmatrix},$$

where the matrix segment $Z_t$ consists of collected samples which are here devoid of calibration errors.

The estimate of the reference covariance matrix is in turn expressed as $\widehat{R_{ZZ}^t} = [\widehat{r_{k,l}^t}]$.

The method then comprises a step E3 of calculating a product matrix $\mathcal{H}$, resulting from the term-by-term matrix product of the observed covariance matrix $R_{ZZ}^{t,e}$ with the estimate $\widehat{R_{ZZ}^t}$ of the reference covariance. This term-by-term product (also called Hadamard matrix product) is expressed as $\mathcal{H} = R_{ZZ}^{t,e} \cdot (\widehat{R_{ZZ}^t})^*$.

If the estimate of the reference covariance matrix were perfect (that is to say, $\widehat{R_{ZZ}^t} = R_{ZZ}^t$), then the product matrix would be expressed as:

$$\mathcal{H} = \begin{pmatrix} r_{1,1}^2 & |r_{1,2}|^2 e^{i\Delta_{1,2}} & |r_{1,3}|^2 e^{i\Delta_{1,3}} & |r_{1,4}|^2 e^{i\Delta_{1,4}} \\ |r_{1,2}|^2 e^{-i\Delta_{1,2}} & r_{2,2}^2 & |r_{2,3}|^2 e^{i\Delta_{2,3}} & |r_{2,4}|^2 e^{i\Delta_{2,4}} \\ |r_{1,3}|^2 e^{-i\Delta_{1,3}} & |r_{2,3}|^2 e^{-i\Delta_{2,3}} & r_{3,3}^2 & |r_{3,4}|^2 e^{i\Delta_{3,4}} \\ |r_{1,4}|^2 e^{-i\Delta_{1,4}} & |r_{2,4}|^2 e^{-i\Delta_{2,4}} & |r_{3,4}|^2 e^{-i\Delta_{3,4}} & r_{4,4}^2 \end{pmatrix}.$$

The non-diagonal terms of this product matrix are complex coefficients whose argument is representative of the phase shift of channels 2, 3 and 4 with respect to the reference channel 1.

The method thus comprises a step E4 of determining the argument of complex terms of the product matrix $\mathcal{H}$, this step allowing (in the case of a perfect estimate of the reference covariance matrix) to determine the terms $e^{-i\Delta_{1,2}}$, $e^{-i\Delta_{1,3}}$, and $e^{-i\Delta_{1,4}}$ which characterize the phase shift affecting channels 2 to 4 relative to the channel 1. These are actually estimates $\widehat{e^{-i\Delta_{1,2}}}, \widehat{e^{-i\Delta_{1,3}}}, \widehat{e^{-i\Delta_{1,4}}}$ of these terms which are determined at the end of this step E4.

The method then comprises a step E5 of correcting (also designated by the term compensation) the phase shifts affecting the channels 2 to 4 relative to the channel 1. This step may comprise the determination of a compensation matrix Y from the previously estimated phase shifts and the application of this compensation matrix to the considered matrix segment $Z_t^f$.

The compensation matrix can thus be written $$\Upsilon = \begin{pmatrix} 1 & 0 & 0 & 0 \\ 0 & \widehat{e^{-i\Delta_{1,2}}} & 0 & 0 \\ 0 & 0 & \widehat{e^{-i\Delta_{1,3}}} & 0 \\ 0 & 0 & 0 & \widehat{e^{-i\Delta_{1,4}}} \end{pmatrix}$$

and the compensation of the relative phase difference allows to determine a compensated matrix segment $Z_t^c$ as follows: $Z_t^c = Z_t^e \Upsilon = Z_t \Xi Y = Z_t \xi_1$ (ideally), that is to say $Z_t$ is known to within a phase shift $\varepsilon_1$.

The invention uses an array of antennas $\mathcal{R}_M$ including M ($\geq 2$) antenna elements numbered from 1 to M whose physical characteristics, in particular the radiation pattern and the maximum unit gain denoted $G_U$, are known.

The antenna array differentiates and identifies the incident radio signals according to the relative amplitudes and phases that these signals elicit at the antenna elements of the array. The amplitude and phase variation induced at each antenna element by an incident signal (that is to say the response of the antenna element to the incident signal) can be materialized by a complex coefficients indexed by the number m of the concerned antenna element. All these complex coefficients form a vector which is here designated by the term "spatial signature" of the incident signal: $S = (s_1 \; s_2 \; \ldots \; s_m \; \ldots \; s_{M-1} \; s_M)$.

Each coefficient $s_m$, $m = 1 \ldots M$, of S incorporates information related:

To the path difference of the incident signal received by the antenna element m with respect to a reference antenna element (the antenna element 1 by convention). This path difference depends on the geometry of the antenna array $\mathcal{R}_M$, the azimuth $\varphi$ and the elevation $\theta$ of the incident signal. This path difference is denoted $\delta_{1,m}(\varphi, \theta)$ (with $\delta_{1,1}(\varphi, \theta) = 0$ meter). The phase variation induced by $\delta_{1,m}(\varphi, \theta)$ is given by:

$$\Phi_m(\varphi, \theta) = e^{-i\frac{2\pi}{\lambda}\delta_{1,m}(\varphi,\theta)} = e^{-i\kappa\delta_{1,m}(\varphi,\theta)},$$

where $\lambda$ and $\kappa$ denote respectively the wavelength and the wave number of the incident signal.

To the physical characteristics of the antenna array (such as the radiation pattern of the constituent antenna elements, the coupling between these antenna elements, etc.) which induce an amplitude and phase variation denoted $\Psi_m(\varphi, \theta)$.

Ultimately, each coefficient of the spatial signature is modeled as follows:

$$s_m = \Phi_m(\varphi,\theta)\Psi_m(\varphi,\theta) = \Psi_m(\varphi,\theta)e^{-i\kappa\delta_{1,m}(\varphi,\theta)}$$

In one possible embodiment of the invention, the spatial signatures of the incident radio signal(s) allow to determine the estimate $\widehat{R_{ZZ}^t}$ of the reference covariance matrix. In particular, this estimate $\widehat{R_{ZZ}^t}$ can be made up of terms which depend on a linear combination of the matrices obtained by performing the product $S^H S$ of the spatial signatures S of the reference radio signal(s) on the multi-element antenna, each spatial signature expressing as seen above the response of each antenna element to each of the reference radio signal (s).

More particularly, each spatial signature of a reference radio signal can be weighted in the linear combination by a power of the reference radio signal.

By noting $S_b$ the spatial signature of a reference signal on the multi-element antenna (expressed in the shape of a rectangular matrix having as many columns as analog reception channels) and $p_b$ the power of this reference signal, the estimate $\widehat{R_{ZZ}^t}$ of the reference covariance matrix can be expressed as $$\hat{R}_{zz}^t = [\hat{r}_{k,l}^t] = \sum_{b=1}^{B} p_b S_b^H S_b,$$

where B is the number of reference signals.

In the case of a single reference signal, $\hat{R}_{ZZ}^t = S_1^H S_1$ ($p_1$ is not used here) and the term-by-term matrix product $\mathcal{H} = R_{ZZ}^{t,e} \cdot (\hat{R}_{ZZ}^t)^*$ can be simplified as follows:

$$\mathcal{H} = [h_{k,l}] = [e^{i\angle(r_{k,l}^{t,e})}] \cdot [e^{-i\angle(\widehat{r_{k,l}^t})}] = [$$
$$e^{i\angle(r_{k,l}^{t,e}(\widehat{r_{k,l}^t})^*)}].$$

The angle $\angle(r_{k,l}^{t,e}(\widehat{r_{k,l}^t})^*)$ being small, $\mathcal{H}$ can simply be written:

$$\mathcal{H} = [1 + i\angle(r_{k,l}^{t,e}(\widehat{r_{k,l}^t})^*)]$$

In a possible embodiment, obtaining in step E2 the estimate of the reference covariance matrix comprises obtaining a pre-calculated matrix or calculating the estimate of the reference covariance matrix. In each of these cases, the estimate can be (pre)calculated by having a priori knowledge of the reference radio signal(s), and more particularly of their direction of arrival on the multi-element antenna and, if necessary, of their power. This a priori knowledge allows to determine the spatial signatures of the reference radio signal(s) and from there to estimate the reference covariance matrix.

In the absence of such a priori knowledge, the invention proposes another embodiment illustrated in FIG. 2. This other embodiment advantageously finds application in a receiver of a GNSS system whose spatial processing module 35 is configured to implement anti-jamming processing. Such a module 35 is indeed configured to detect jamming signals and to implement a step (step E21 below) allowing to characterize these signals. It is thus understood that in the invention, the reference radio signal(s) can be unknown signals such as, for example, jamming signals.

In this other possible embodiment illustrated in FIG. 2, obtaining, in step E2, the estimate of the reference covariance matrix comprises calculating the estimate of the reference covariance matrix, this calculation comprising a step E21 of estimating the direction of arrival ($\widehat{\varphi_b}, \widehat{\theta_b}$) on the multi-element antenna of the reference signal(s), and if applicable their power $\widehat{p_b}$. This step E21 can for example be carried out in accordance with the ESPRIT ("Estimation of Signal Parameters via Rotational Invariance Techniques") or MUSIC ("Multiple Signal Classification") algorithms.

Step E21 is followed by a step E22 of estimating the spatial signature(s) $S_{\widehat{\theta_b}}$ of the reference signal(s) from the estimation of the direction of arrival ($\widehat{\varphi_b}, \widehat{\theta_b}$) on the multi-element antenna of the reference signal(s), and if applicable their power $\widehat{p_b}$. Finally, this calculation comprises a step E23 of estimating the reference covariance matrix providing its estimate according to $$\hat{R}_{zz}^t = [\hat{r}_{k,l}^t] = \sum_{b=1}^{B} \widehat{p_b} (S_{\widehat{(\varphi_b, \theta_b)}})^H S_{\widehat{(\varphi_b, \theta_b)}}.$$

The estimation of the direction of arrival, in azimuth and in elevation ($\widehat{\varphi_b}, \widehat{\theta_b}$), of an incident reference signal is necessarily vitiated by an error precisely because of the amplitude and phase differences (which the invention seeks to estimate and compensate for) affecting the reception channels relative to each other and consequently the digitized multi-channel signal (whose estimated covariance matrix is used by the ESPRIT or MUSIC algorithms). This estimation error on the direction of arrival does not, however, prevent a sufficiently suitable estimation of the reference covariance matrix. In a possible variant embodiment, this estimate can be used to initiate an iterative algorithm which will ultimately allow the precise estimation of the relative phase differences sought. Indeed, the first observed covariance matrix $R_{ZZ}^{t,e}$ of the multi-channel signal (initially uncorrected) allows to obtain a first estimate of the direction of arrival ($\widehat{\varphi_b}, \widehat{\theta_b}$). Then, the initial estimate of the reference covariance matrix $\hat{R}_{ZZ}^t$ (produced from the first estimate of the direction of arrival) allows to obtain a first estimate of the phase differences which, applied to the multi-channel signal (first compensation), will allow to obtain, after a new calculation of the observed covariance matrix $R_{ZZ}^{t,e}$, a second more precise estimate of the direction of arrival which in turn will allow to obtain a second more precise reference covariance matrix $\hat{R}_{ZZ}^t$ allowing a more precise estimation of the relative phase differences and so on. In an exemplary embodiment, this iterative process is terminated when an absolute phase shift indicator described below is less than a predefined threshold. In summary, when the direction of arrival of the incident signal(s) is not known, the relative phase differences sought can be estimated at the end of an iterative process. In other words, according to this iterative process, the determination E1-E4 and correction E5 steps are reiterated, for each analog reception channel other than the reference channel, of a phase shift with the reference channel.

In the context of the invention, the correction of the phase shifts can be carried out only once in time. It can nevertheless be repeated, especially when a given metric exceeds a predefined threshold. Thus, in a possible embodiment, the determination, for each analog reception channel other than the reference channel, of the phase shift with the reference channel is repeated, an absolute phase shift indicator is calculated at the end of each of the repetitions and a new correction, for each analog reception channel other than the reference channel, of the phase shift with the reference channel is carried out if the absolute phase shift indicator calculated at the end of a repetition is greater than a threshold.

The absolute phase shift indicator can express the accumulation of absolute phase shifts between the paired terms of the observed covariance matrix and the estimate of the reference covariance matrix and be expressed according to $$\mathcal{M} = \sum_{k=1}^{M} \sum_{l=k+1}^{M} |\angle(h_{k,l})|.$$

The new correction can exploit, for each analog reception channel other than the reference channel, an average of the phase shifts with the reference channel determined at each repetition subsequent to the previous correction. The matrix Y used is thus formed from the averages of the sets of terms $\{e^{-i\Delta_{1,2}}\}$, $\{e^{-i\Delta_{1,3}}\}$ and $\{e^{-i\Delta_{1,4}}\}$ estimated during successive repetitions separating two consecutive corrections.

The invention is not limited to the method as previously described and also extends to a data processing unit comprising a processor configured to implement this method. The invention further extends to a multi-channel radio receiver comprising such a data processing unit, in particular a data processing unit integrated in a GNSS anti-jamming processing module such as the spatial processing module 35 used in a GNSS receiver. The invention also extends to a computer program product comprising instructions which, when the program is executed by a computer, lead the latter to implement the method.

The invention claimed is:

1. A computer-implemented method of calibrating a receiver comprising a plurality of analog reception channels, each including an antenna element of a multi-element antenna, the plurality of analog reception channels comprising a reference channel, the computer-implemented method comprising:
   determining, for each analog reception channel other than the reference channel of the plurality of analog reception channels, a phase shift with the reference channel, wherein the determining comprises:
      calculating an observed covariance matrix representative of a covariance between pairs of a series of samples of one or more reference radio signals incident on the multi-element antenna, the pairs of the series of samples being collected in parallel on each analog reception channel of the plurality of analog reception channels over a period of time,
      obtaining an estimate of a reference covariance matrix representative of a covariance between pairs of series of samples of said one or more reference radio signals which would be collected in parallel on each analog reception channel of the plurality of analog reception channels over the period of time in the absence of a phase shift between the analog reception channels,
      calculating a product matrix, resulting from a term-by-term matrix product of the observed covariance matrix with the estimate of the reference covariance matrix; and
      determining an argument of complex terms of the product matrix, and
   correcting, for each analog reception channel other than the reference channel of the plurality of analog reception channels, the phase shift with the reference channel, based on the argument of the complex terms of the product matrix.

2. The computer-implemented method according to claim 1, wherein the estimate of the reference covariance matrix is made up of terms which depend on a linear combination of matrices obtained by performing a product of spatial signatures of the one or more reference radio signals incident on the multi-element antenna, each spatial signature expressing a response of each antenna element to each of the one or more reference radio signals.

3. The computer-implemented method according to claim 2, wherein each spatial signature of a reference radio signal is weighted in the linear combination by a power of the reference radio signal.

4. The computer-implemented method according to claim 1, wherein obtaining the estimate of the reference covariance matrix comprises obtaining a pre-calculated matrix.

5. The computer-implemented method according to claim 1, wherein obtaining the estimate of the reference covariance matrix comprises calculating the estimate of the reference covariance matrix.

6. The computer-implemented method according to claim 5, wherein calculating the estimate of the reference covariance matrix comprises estimating a direction of arrival of the one or more reference radio signals incident on the multi-element antenna.

7. The computer-implemented method according to claim 2, wherein obtaining the estimate of the reference covariance matrix comprises calculating the estimate of the reference covariance matrix and further comprising estimating the spatial signature of the one or more reference radio signals incident on the multi-element antenna.

8. The computer-implemented method according to claim 7, comprising reiterating the determining, for each analog reception channel other than the reference channel of the plurality of analog reception channels, the phase shift with the reference channel and the correcting, for each analog reception channel other than the reference channel of the plurality of analog reception channels, the phase shift.

9. The computer-implemented method according claim 1, comprising repeating the determining, for each analog reception channel other than the reference channel of the plurality of analog reception channels, the phase shift with the reference channel,
   wherein an absolute phase shift indicator is calculated at an end of each repetition, and
   wherein the computer-implemented method comprises performing a new correction, for each analog reception channel other than the reference channel of the plurality of analog reception channels, of the phase shift with the reference channel when the absolute phase shift indicator calculated at the end of a repetition is greater than a threshold.

10. The computer-implemented method according to claim 9, wherein the new correction uses, for each analog reception channel other than the reference channel of the plurality of analog reception channels, an average of the phase shifts with the reference channel determined at each iteration subsequent to a previous correction.

11. The computer-implemented method according to claim 1, wherein the receiver comprises a spatial filtering unit, the spatial filtering unit comprising a plurality of analog-to-digital converters and a spatial processing module,
   wherein the phase shift is corrected by the spatial processing module.

12. The computer-implemented method according to claim 11, wherein the correcting comprises applying, by the spatial processing module, phase and amplitude weightings to signals received by the antenna elements of the multi-element antenna.

13. The computer-implemented method according to claim 1, wherein the correcting comprises:
   determining a compensation matrix from the phase shifts, and
   applying the compensation matrix to the series of samples collected in parallel on each analog reception channel of the plurality of analog reception channels over a period of time.

14. The computer-implemented method according to claim 1, wherein each analog reception channel comprises a radio frequency (RF) front-end circuit, and
   wherein the correcting comprises:
   determining a compensation matrix from the phase shifts, and
   applying the compensation matrix to signals received by the antenna elements of the multi-element antenna to correct the phase shift.

15. A data processing unit comprising a processor configured to implement the method according to claim 1.

16. A multi-channel radio receiver, comprising the data processing unit according to claim 15.

17. The multi-channel radio receiver according to claim 16, wherein said data processing unit is integrated in an anti-jamming processing module.

18. A non-transitory computer-readable medium comprising instructions which, when executed by a computer, cause the computer to carry out the method according to claim 1.

* * * * *